Sept. 19, 1944.  W. P. HILL  2,358,711
METHOD OF MANUFACTURING PUMP ASSEMBLIES
Filed Nov. 10, 1941  2 Sheets-Sheet 1
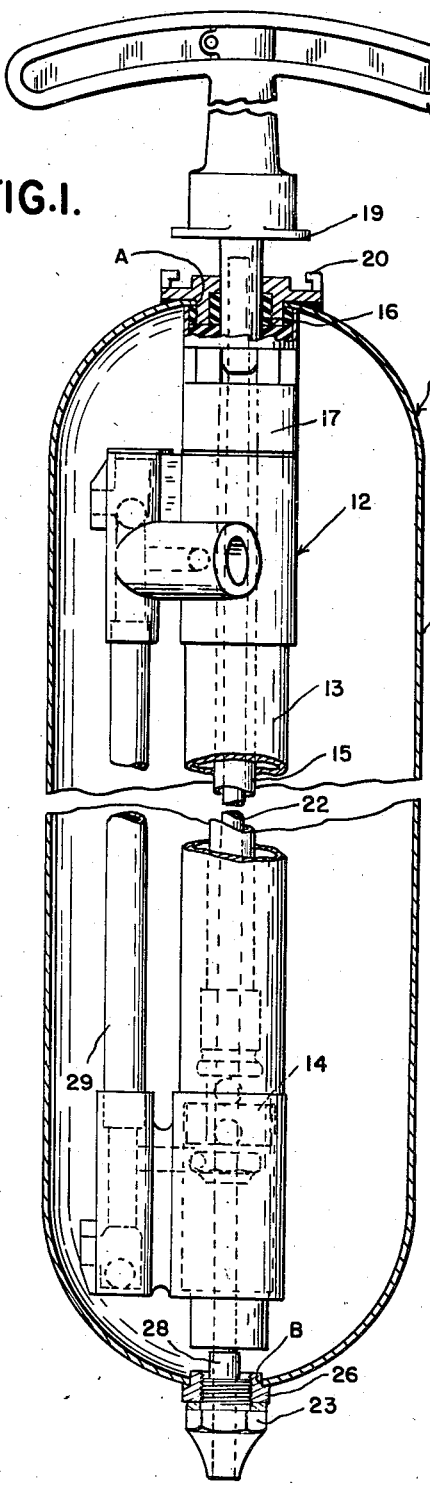
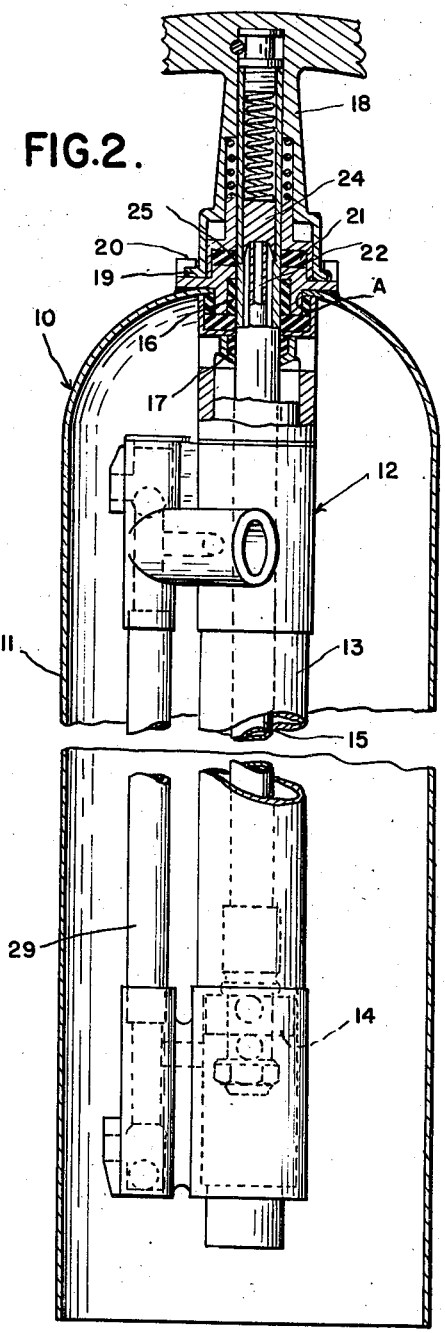
INVENTOR.
WALTER P. HILL Sept. 19, 1944. W. P. HILL 2,358,711
METHOD OF MANUFACTURING PUMP ASSEMBLIES
Filed Nov. 10, 1941 2 Sheets-Sheet 2

INVENTOR.
WALTER P. HILL
ATTORNEYS

Patented Sept. 19, 1944

2,358,711

UNITED STATES PATENT OFFICE 2,358,711

METHOD OF MANUFACTURING PUMP ASSEMBLIES

Walter P. Hill, Detroit, Mich., assignor, by mesne assignments, to Calumet and Hecla Consolidated Copper Company, Calumet, Mich., a corporation of Michigan Application November 10, 1941, Serial No. 418,601

2 Claims. (Cl. 29—156.4)

This invention relates to a method of manufacturing a pump assembly of the type wherein the pump cylinder is housed in a casing containing the fluid to be discharged and also refers to an improved method of manufacturing pump assemblies of this type.

One of the principal objects of this invention is to provide a pump assembly having a casing formed from a length of seamless tubing whereby the necessity for joints is reduced to a minimum, and wherein the pump mechanism may be readily housed and the entire device assembled quickly, economically and with a minimum number of parts and operations.

In accordance with this invention I provide a casing formed from a length of seamless tubing and having the opposite ends reduced to confine the pump cylinder in the casing and to form restricted openings at each end of the casing for respectively receiving a packing means for the pump operating plunger and a discharge fitting or nipple.

Another object of this invention is to provide a pump assembly of the type set forth above having a discharge tube provided at one end with a fitting or nipple and having a coupling secured to the pump casing for removably connecting the fitting or nipple to the casing whereby the discharge tube may be readily removed whenever it is desired to clean or repair the same. Also the casing may be filled with the desired fluid by merely removing the nipple and associated discharge tube. An added advantage of this construction is that it eliminates the necessity of providing a separate filler opening in the casing with its resultant joint and thereby simplifies the manufacture, and reduces the cost of the construction.

In addition to the foregoing, the present invention contemplates an improved method of manufacturing pump assemblies of the type set forth above. In accordance with this invention, a length of tubular stock is reduced at one end and a pump assembly is inserted into the casing through the opposite end. The pump plunger is extended through the reduced end and a packing gland or seal is suitably secured to the reduced end. The said opposite end of the casing is then reduced and a threaded coupling is secured thereto. A discharge tube is extended into the pump through the coupling and a nipple at the end of this tube is threaded in the coupling.

The foregoing, as well as other objects, will be made more apparent as this description proceeds, especially when considered in connection with the accompanying drawings, wherein:

Figure 1 is a sectional view of a pump assembly constructed in accordance with this invention;

Figure 2 is a view similar to Figure 1 showing the pump assembly as it appears when partially completed;

Figure 4:
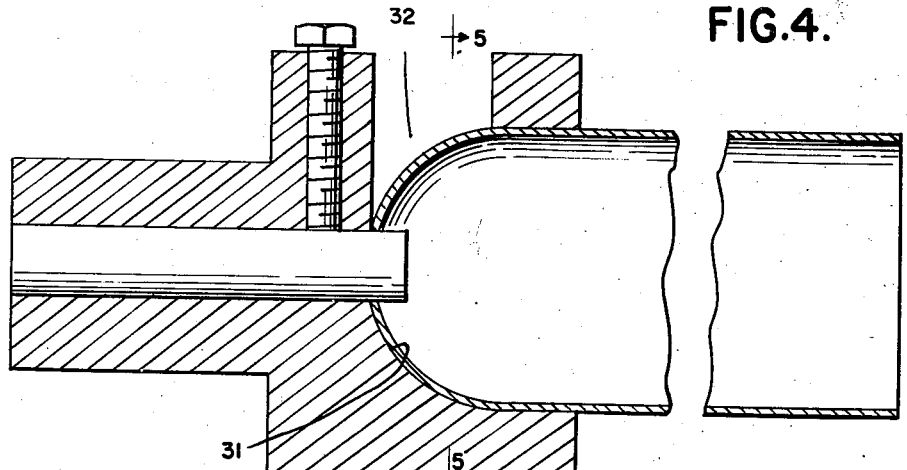
Figure 4 is a sectional view taken on the line 4—4 of Figure 3.
Figure 3:
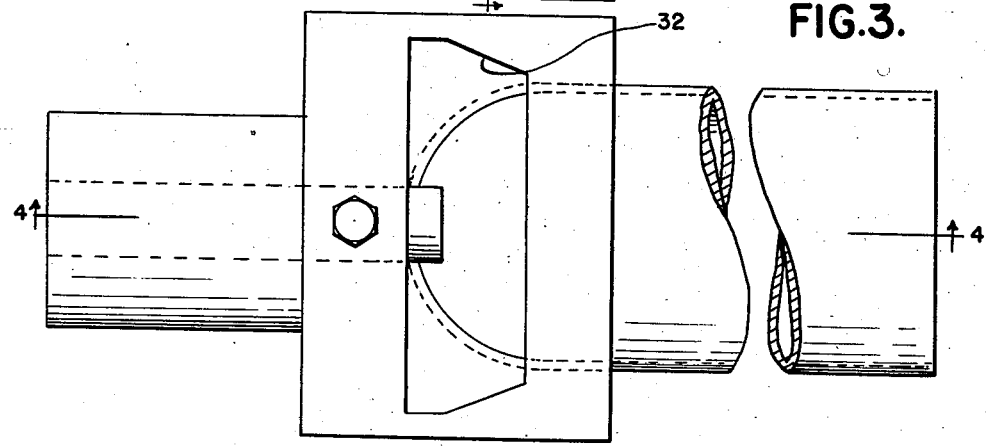
Figure 3 is a top plan view showing one step in the method of manufacturing the pump assembly.
Figure 5:
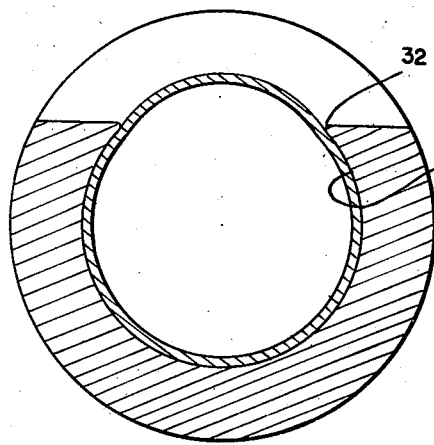
Figure 5 is a cross sectional view taken on the line 5—5 of Figure 4.

For the purpose of illustrating this invention I have selected a fire extinguisher of the type embodying a casing adapted to contain the fluid and having a plunger operated pump supported in the casing for discharging the fluid from the casing. It is to be understood, however, that this invention is not limited to fire extinguishers and may be employed to advantage in manufacturing any pump assembly wherein the pump cylinder is housed in a casing.

With the above in view reference will now be made to the drawings wherein it will be noted that the reference character 10 indicates generally a pump assembly comprising a casing 11 and a plunger operated double acting pump 12 having a cylinder 13 housed in the casing 11. The casing is adapted to be filled with a suitable fluid and the pump 12 discharges this fluid from the casing.

The casing 11 is formed from a length of seamless tubing and is reduced at opposite ends to confine the pump cylinder 13 therein. In reducing the opposite ends of the casing, restricted openings A and B are formed at opposite ends of the casing. The opening A enables the pump plunger to be extended through the casing for operation and the opening B accommodates the fluid discharge fitting to be more fully hereinafter referred to. The above construction of casing lends itself to economical manufacture because it obviates the necessity of providing separate closures for either or both ends of the casing and otherwise reduces the number of joints, parts and operations to a minimum. By eliminating joints or seams in the casing, leakage is prevented and this is especially advantageous in cases where the assembly is stored for long periods with fluid therein.

The specific pump shown herein forms no part of this invention and may be of any standard or desired design. In the form illustrated herein the pump comprises the cylinder 13 and a piston 14 reciprocably mounted in the cylinder. The piston is secured to a plunger 15 in the form of a tube which extends through the upper end of the cylinder and through the corresponding end of the casing. A suitable packing means 16 is secured to the top of the casing for slidably receiving the plunger 15 and prevents escape of fluid through the upper end of the casing. A second seal 17 is arranged to have a wiping engagement with the plunger at a point immediately below the seal 16 and cooperates with the latter to reduce fluid leaks to a minimum.

The piston plunger 15 is operated by a handle 18 secured to the upper end of the plunger and adapted to be locked when the pump is not in use by rotating the same relative to the plunger to engage the lugs 19 on the lower end of the handle shank with the lugs 20 fixed to the top of the casing. When the handle 18 is locked in place, as shown in Figure 2, fluid is prevented from escaping past the gland 16 by a spring pressed seal 21 housed in the shank of the handle.

A discharge tube 22 extends through the plunger tube 15 and is secured at its lower end to a fitting or nipple 23 which, in turn, is secured to the lower end of the casing 11. The upper end of the discharge tube 22 is closed in the locked position of the handle 18 by a spring pressed valve 24 slidably mounted in the plunger and engageable with an annular shoulder 25 on the plunger tube during operation of the pump. This construction prevents fluid in the pump plunger from entering the discharge tube when the device is not in use.

In accordance with this invention the discharge fitting or nipple 23 is removably secured to the lower end of the casing 11 by a coupling 26 suitably secured in the opening B in the bottom of the casing and internally threaded for engagement with the external threads on the nipple 23. It is important to note at this time that the above construction enables the casing 11 to be filled with fluid through the coupling 26 by merely removing the nipple 23. As a result, the filler opening and associated closure, heretofore, required in pump assemblies of the type referred to, may be eliminated. Moreover, since the discharge tube 22 is removable with the nipple 23, it follows that this tube may be readily detached from the assembly for cleaning or repair purposes, when desired. The nipple 23 is provided with a projection 28 forming a seat for the lower end of the pump.

The operation of the pump 12 is well understood by those skilled in this art and a detailed description of the same is not required for an understanding of this invention. It will suffice to point out that the pump is of the double acting type so that fluid is discharged from the casing 11 through the discharge tube 22 and nipple 23 when the plunger 15 is moved in both directions. In general, when the piston 14 on the plunger is moved in an upward direction, the fluid above the piston enters the plunger tube 15 through a suitable opening formed in the tube above the piston and flows in an upward direction to the open upper end of the discharge tube 22. This fluid is discharged from the tube 22 upon continued upward movement of the piston and, at the same time, fluid is drawn into the pump cylinder 13 below the piston 14. The plunger tube 15 is also provided with an opening below the piston 14 so that when the latter is moved downwardly in the cylinder fluid enters the plunger tube 15 and flows into the discharge tube 22 through the open upper end thereof. It may be pointed out at this time that fluid is supplied to the cylinder 13 above the piston 14 as the latter is moved downwardly by a by-pass tube 29. The valve arrangement rendering the above operation possible is not shown herein and is preferably identical to the pumps employed in plunger operated fire extinguishers.

In manufacturing the pump assembly previously described, a length of tubular stock, preferably seamless tubing, having the dimensions necessary to form the casing 11 is substantially reduced at one end to provide the restricted opening A at the latter end. Particularly satisfactory results are obtained by reducing the end of the tubular stock with the reducing tool shown and described in my copending application, Serial #366,757, filed November 22, 1940. Briefly described, this tool comprises a female die having a cavity 31 therein corresponding in shape to the contour it is desired to impart to the end of the length of tubular stock and having a portion 32 of the forming surface relieved. The length of tubular stock and the reducing tool are relatively moved toward each other to extend the end of the stock to be reduced into the cavity and apply an endwise pressure on the stock. At the same time the stock and reducing tool are relatively rotated and the stock is thoroughly worked by one or both edges of the relief portion 32. As pointed out in detail in the above identified application, the relief portion 32 extends for substantially the full length of the working face of the die and relieves confinement of the stock for a sufficient portion of its circumference to permit distortion of a portion of the stock during the reducing operation. This feature is important because it enables a relatively large reduction of the end of the stock without the danger of folding, tearing or otherwise harming the stock.

After the upper end of the stock is reduced, the seal 16 is inserted into the opening A and is suitably secured in place. The pump 12 is then assembled in the casing 11 by inserting the pump as a unit into the stock through the lower end. The plunger tube 15 is extended through the seal 16 and the handle assembly 18 is secured to the projecting end of the plunger. Upon completion of the above operation, the lower end of the stock is reduced in the same manner as the upper end to form the casing 11 and to confine the pump cylinder 13 in the casing.

As a result of reducing the lower end of the stock, the restricted opening B is formed and the coupling 26 is suitably secured in this opening. The casing 11 is then filled with the fluid through the opening in the coupling and the discharge tube 22 is secured in place by threading the nipple 23 in the coupling.

Inasmuch as the length of tubular stock is in the form of seamless tubing, it follows that the casing resulting from the above method of manufacture is both seamless and jointless. This is desirable not only from the standpoint of efficient and economical manufacture but also because it reduces any tendency for leaks to develop to a minimum. Also, with the above construction the discharge tube may be readily removed for cleaning or repair purposes and the casing may be filled with the desired fluid through the coupling, thus obviating the necessity of providing a special filler opening.

What I claim as my invention is:

1. The method of manufacturing a pump assembly having a cylinder enclosed in a tubular casing, comprising reducing one end of a length of tubular stock by exerting a reducing pressure by rotating means on a continuous area extending over a major portion of the circumference of the stock while leaving the remaining portion free to deform in response to the reducing pressure, inserting the pump cylinder into the stock through the opposite end of the latter, and reducing the said opposite end of the stock beyond the adjacent end of the pump cylinder to form the casing and to confine the pump cylinder in the casing.

2. The method of manufacturing a pump assembly having a pump including a cylinder enclosed in a seamless and jointless casing having the opposite ends reduced to a diameter substantially less than the outside diameter of the pump cylinder, comprising the steps of reducing one end of a length of tubular stock by exerting a reducing pressure by rotating means on a continuous area extending over a major portion of the circumference of the stock while leaving the remaining portion free to deform in response to the reducing pressure, inserting the pump cylinder into the stock through the opposite end of the latter, and similarly reducing the said opposite end of the stock beyond the adjacent end of the pump cylinder to form said casing and to confine the pump cylinder in the casing.

WALTER P. HILL.